(12) United States Patent
Yun et al.

(10) Patent No.: US 12,283,431 B2
(45) Date of Patent: *Apr. 22, 2025

(54) MULTILAYER ELECTRONIC COMPONENT

(71) Applicant: SAMSUNG ELECTRO-MECHANICS CO., LTD., Suwon-si (KR)

(72) Inventors: Su Yun Yun, Suwon-si (KR); Hong Je Choi, Suwon-si (KR); Ji Hye Han, Suwon-si (KR); Byung Woo Kang, Suwon-si (KR); Hye Jin Park, Suwon-si (KR); Sang Wook Lee, Suwon-si (KR); Jung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 136 days.

This patent is subject to a terminal disclaimer.

(21) Appl. No.: 18/132,195

(22) Filed: Apr. 7, 2023

(65) Prior Publication Data

US 2024/0194408 A1    Jun. 13, 2024

(30) Foreign Application Priority Data

Dec. 8, 2022   (KR) .................. 10-2022-0170208

(51) Int. Cl.
*H01G 4/232*   (2006.01)
*H01G 4/008*   (2006.01)
(Continued)

(52) U.S. Cl.
CPC ........... *H01G 4/2325* (2013.01); *H01G 4/008* (2013.01); *H01G 4/248* (2013.01); *H01G 4/30* (2013.01)

(58) Field of Classification Search
CPC ...... H01G 4/2325; H01G 4/008; H01G 4/248; H01G 4/30; H01G 4/12; H01G 4/1227; H01G 4/232; H01G 4/012
See application file for complete search history.

(56) References Cited

U.S. PATENT DOCUMENTS 10,770,230 B2 *   9/2020   Koo ..................... H01G 4/2325
12,009,154 B2 *   6/2024   Han ......................... H01G 4/30
(Continued)

FOREIGN PATENT DOCUMENTS

JP   2022-039808 A   3/2022
KR   10-2017-0118584 A   10/2017

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a dielectric layer and first and second internal electrodes, first and second external electrodes respectively disposed on opposing surfaces of the body and connected to the first internal electrode, and a third external electrode disposed on the body, disposed between the first and second external electrodes and connected to the second internal electrode. One of the first and second external electrodes includes a first conductive resin layer, the first conductive resin layer includes first conductive particles including at least one of a first metal particle and a first intermetallic compound, and a first resin, and a ratio N1/N2 is 17% or more, in which N1 is the number of particles having a Feret diameter of 14 μm or more, among the first conductive particles, and N2 is a total number of first conductive particles.

20 Claims, 4 Drawing Sheets

(51) Int. Cl.
    *H01G 4/248*     (2006.01)
    *H01G 4/30*     (2006.01)

(56) References Cited

U.S. PATENT DOCUMENTS

| | | | |
|---|---|---|---|
| 2017/0301468 A1* | 10/2017 | Kim | H01G 4/30 |
| 2018/0286594 A1* | 10/2018 | Kim | H01G 4/248 |
| 2019/0157006 A1* | 5/2019 | Han | H01G 4/008 |
| 2019/0295773 A1* | 9/2019 | Kim | H01G 4/30 |
| 2020/0176189 A1* | 6/2020 | Koo | H01G 4/2325 |
| 2021/0065981 A1* | 3/2021 | Kim | H01G 2/065 |
| 2021/0090801 A1* | 3/2021 | Sawada | H01G 4/2325 |
| 2022/0068561 A1* | 3/2022 | Sasaki | H01G 4/0085 |
| 2022/0270825 A1* | 8/2022 | Sasaki | H01G 4/012 |
| 2023/0119122 A1* | 4/2023 | Han | H01G 4/2325 361/753 |
| 2024/0194408 A1* | 6/2024 | Yun | H01G 4/008 |

* cited by examiner

MULTILAYER ELECTRONIC COMPONENT

CROSS-REFERENCE TO RELATED APPLICATION

This application claims benefit of priority to Korean Patent Application No. 10-2022-0170208 filed on Dec. 8, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), which is a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease mounting. As various electronic devices such as computers and mobile devices have been reduced in size and increased in power, demand for miniaturization and high capacitance of multilayer ceramic capacitors has increased.

Recently, various types of multilayer ceramic capacitors, such as multilayer ceramic capacitors including external electrodes in the form of 3 terminals in which the structures of internal and external electrodes are changed to improve frequency characteristics, as well as multilayer ceramic capacitors including external electrodes in the form of general 2-terminal electrodes, have been researched.

Meanwhile, in the related art, an external electrode having a two-layer structure including a fired electrode layer and a conductive resin layer has been applied to protect a multilayer ceramic capacitor from tensile stress generated in a mechanical or thermal environment. However, when the conductive resin layer is applied in a high-temperature reflow environment, a lifting defect may occur at an interface between the sintered electrode layer and the conductive resin layer due to outgassing occurring in the conductive resin layer.

In addition, in the conductive resin layer, metal particles having conductivity are dispersed in a resin to secure electrical connectivity by hopping conduction, and thus the electrical connectivity of the conductive resin layer is lower than that of the sintered electrode layer.

In addition, a significant amount of heat may occur in the multilayer ceramic capacitor due to high resistance of the conductive resin layer, which may shorten the lifespan of the multilayer ceramic capacitor. In particular, when a multilayer ceramic capacitor having a 3-terminal type external electrode is applied as a multilayer ceramic capacitor for a high voltage electric device, it is necessary to effectively reduce DC resistance (Rdc) in order to reduce the amount of heat generated by the multilayer ceramic capacitor.

SUMMARY

An aspect of the present disclosure may provide a multilayer electronic component free from a lifting defect due to outgassing occurring in a conductive resin layer.

An aspect of the present disclosure may also provide a multilayer electronic component in which electrical connectivity of a conductive resin layer is improved.

An aspect of the present disclosure may also provide a multilayer electronic component having low direct current resistance to reduce the amount of generated heat.

According to an aspect of the present disclosure, a multilayer electronic component may include: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; first and second external electrodes respectively disposed on the third and fourth surfaces and connected to the first internal electrode; and a third external electrode disposed on the body, disposed between the first and second external electrodes and connected to the second internal electrode. One of the first and second external electrodes may include a first electrode layer connected to the first internal electrode and a first conductive resin layer disposed on the first electrode layer, the first conductive resin layer may include first conductive particles including at least one of a first metal particle and a first intermetallic compound and a first resin, and a ratio (N1/N2) of N1 to N2 may be 17% or more, in which N1 is the number of particles having a Feret diameter of 14 μm or more, among the first conductive particles, and N2 is a total number of first conductive particles.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
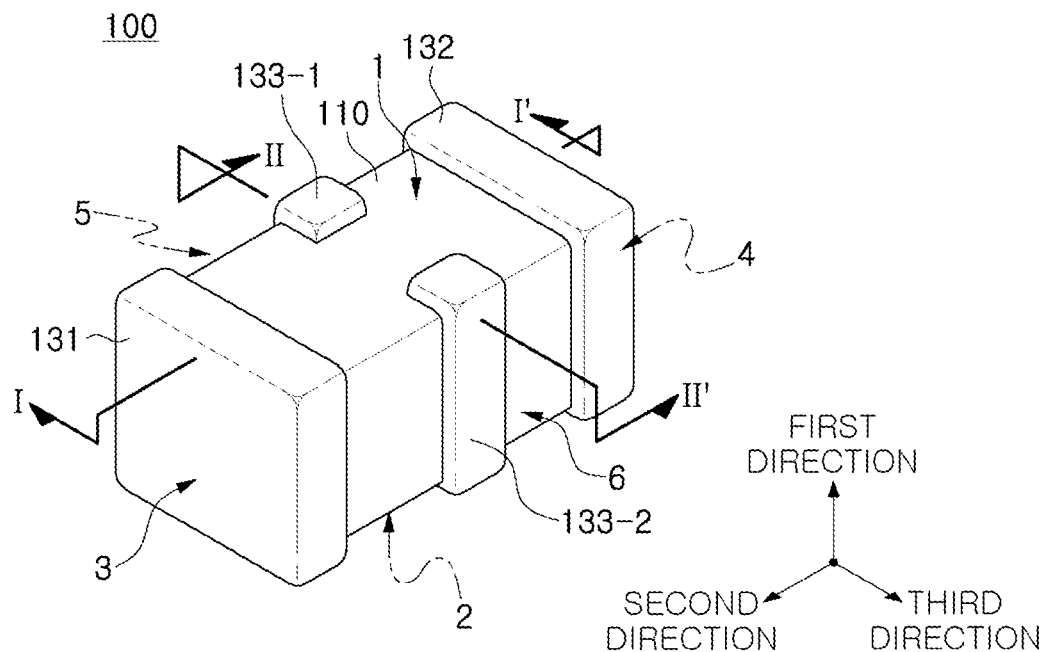
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
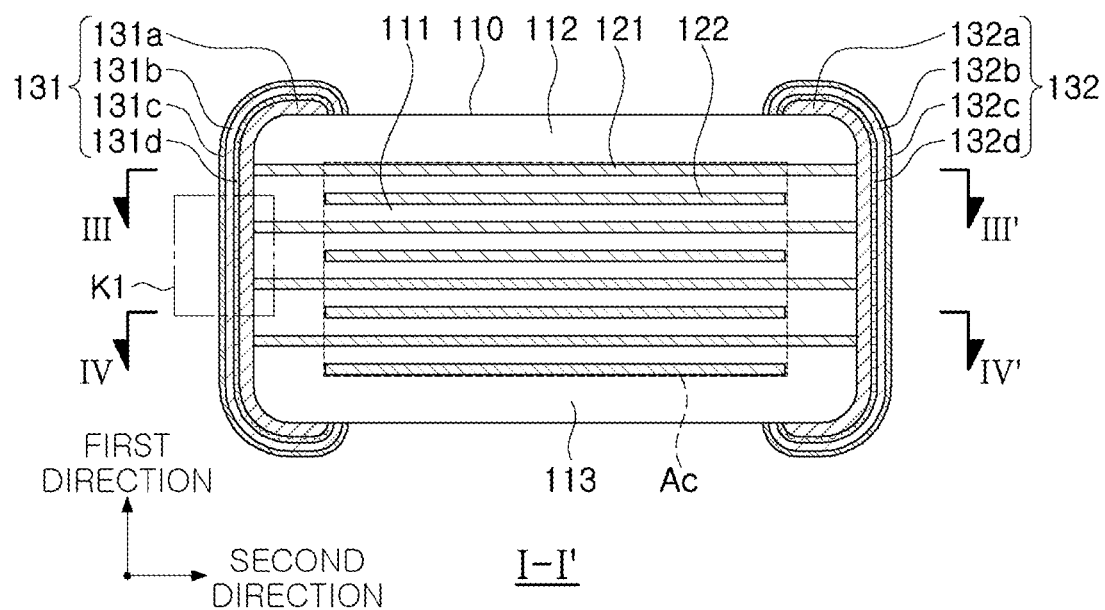
FIG. 2 is a cross-sectional view taken along line I-I' of FIG. 1.

FIG. 2 is a view taken along line I-I' of FIG. 1.

Figure 3:
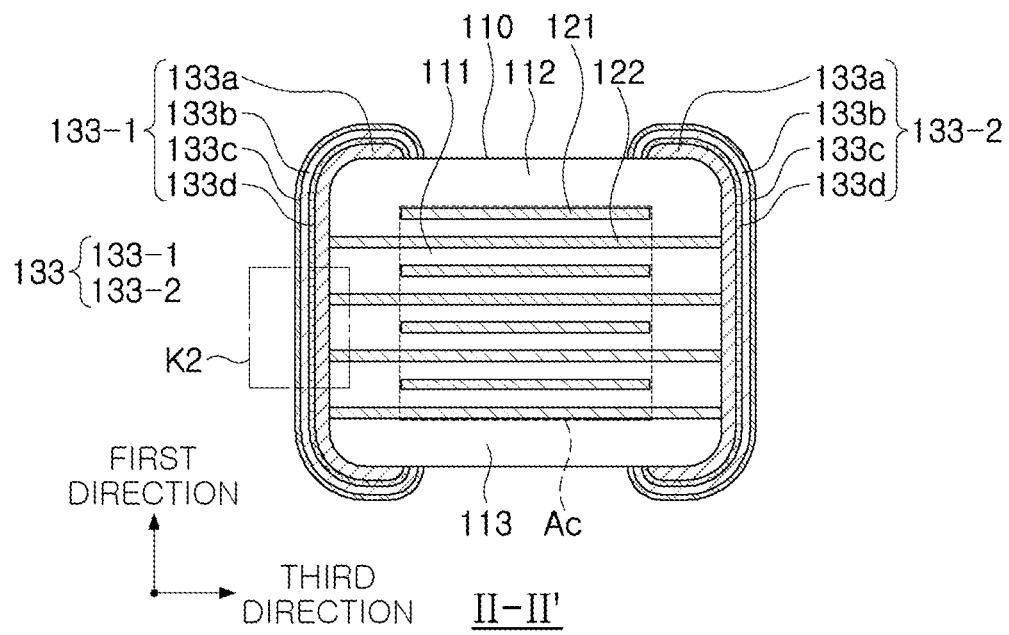
FIG. 3 is a view taken along line II-II' of FIG. 1.

FIG. 3 is a view taken along line II-II' of FIG. 1.

Figure 4:
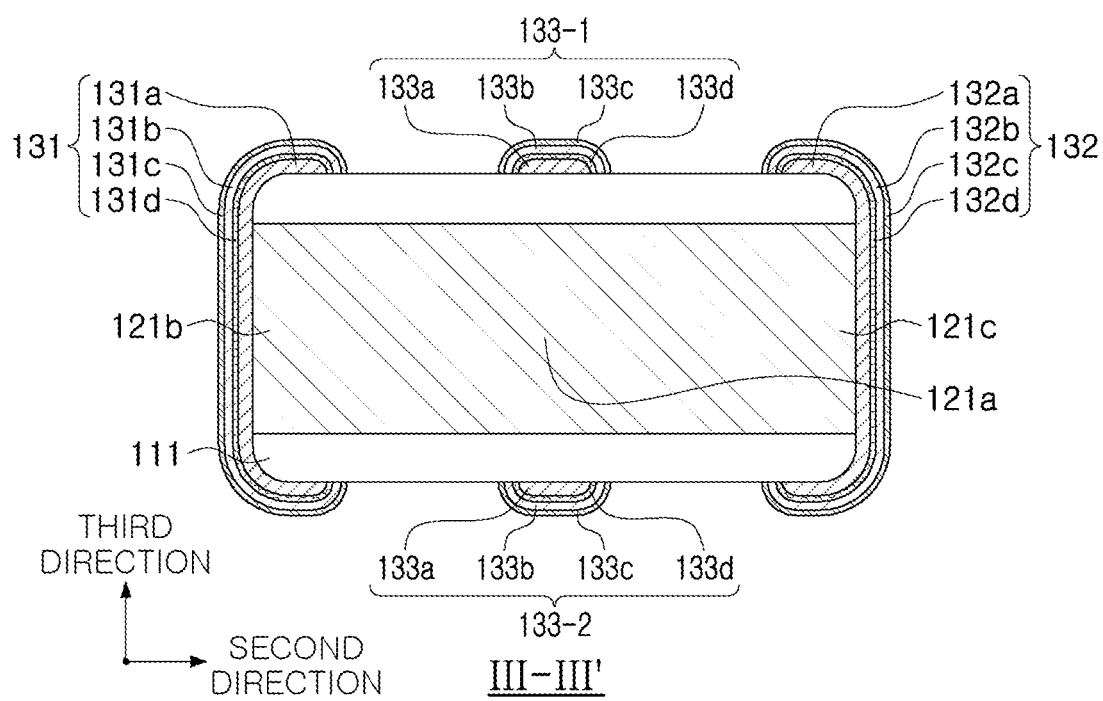
FIG. 4 is a view taken along line III-III' of FIG. 2.

FIG. 4 is a view taken along line III-III' of FIG. 2.

Figure 5:
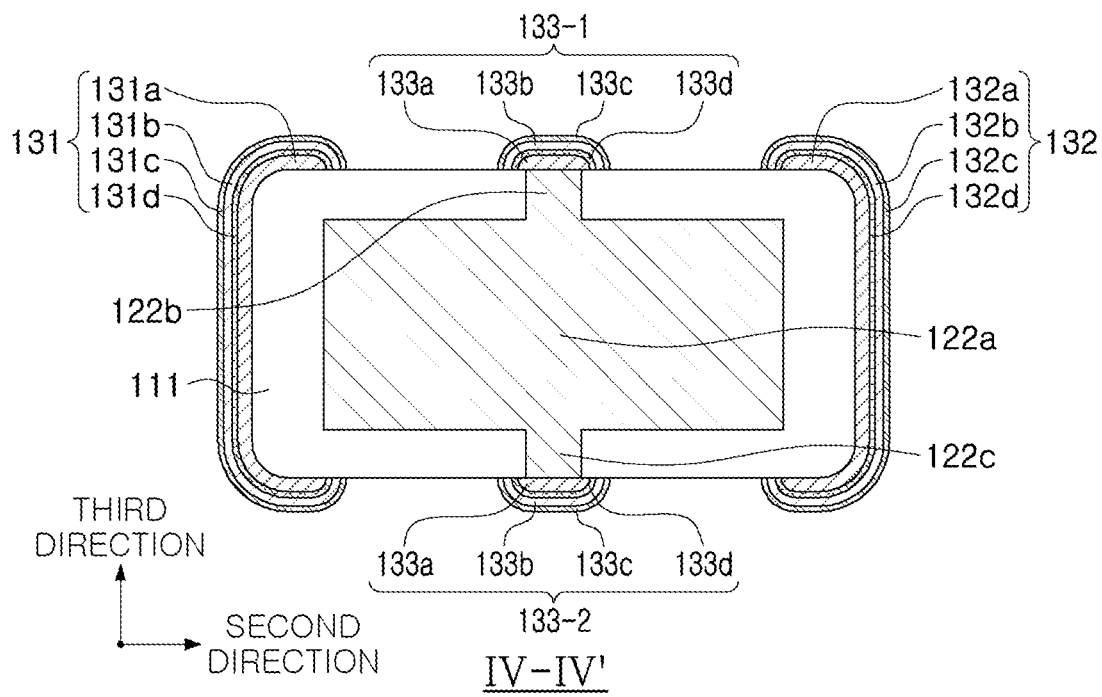
FIG. 5 is a view taken along line IV-IV' of FIG. 2.

FIG. 5 is a view taken along line IV-IV' of FIG. 2.

Figure 6:
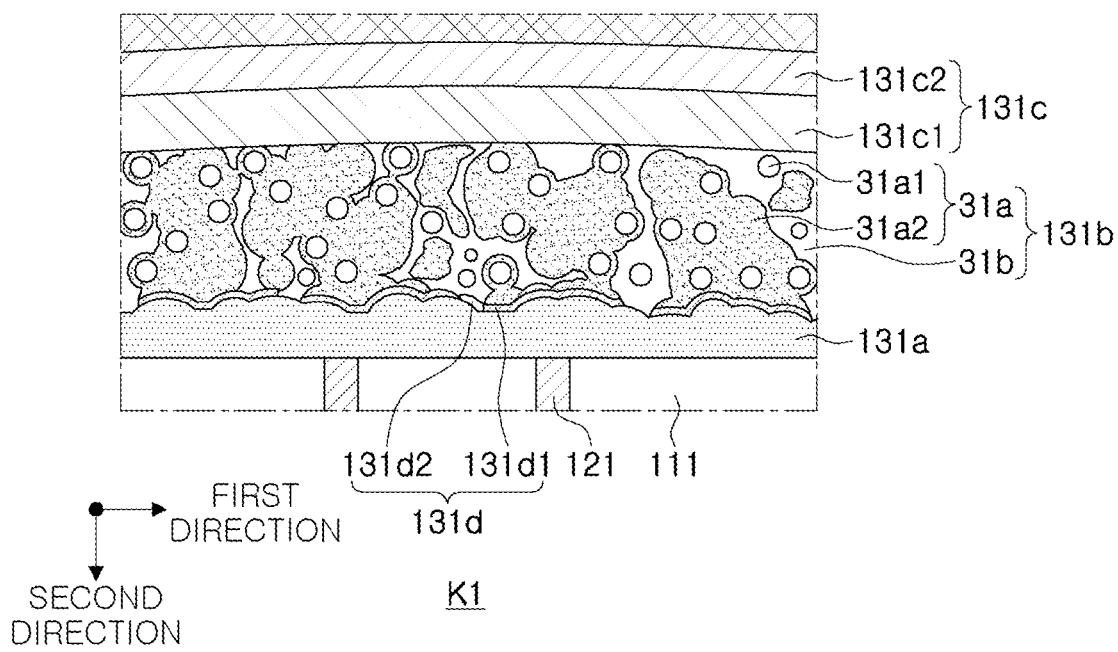
FIG. 6 is an enlarged view of region K1 of FIG. 2.

FIG. 6 is an enlarged view of region K1 of FIG. 2.

Figure 7:
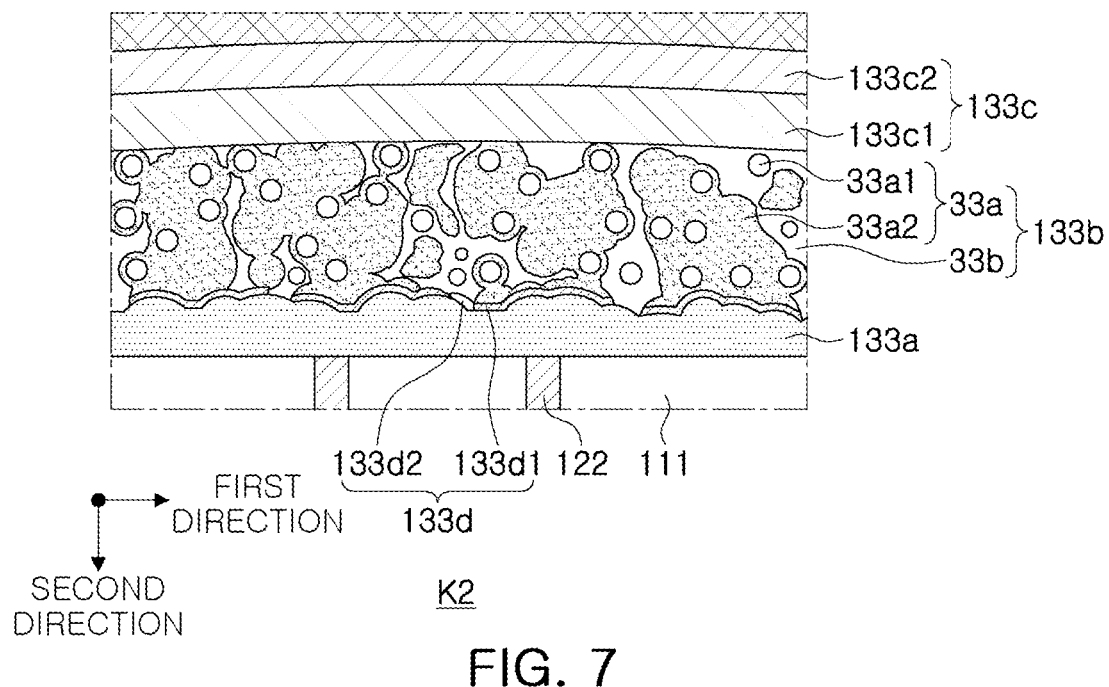
FIG. 7 is an enlarged view of region K2 of FIG. 3.

FIG. 7 is an enlarged view of region K2 of FIG. 3.

Figure 8:
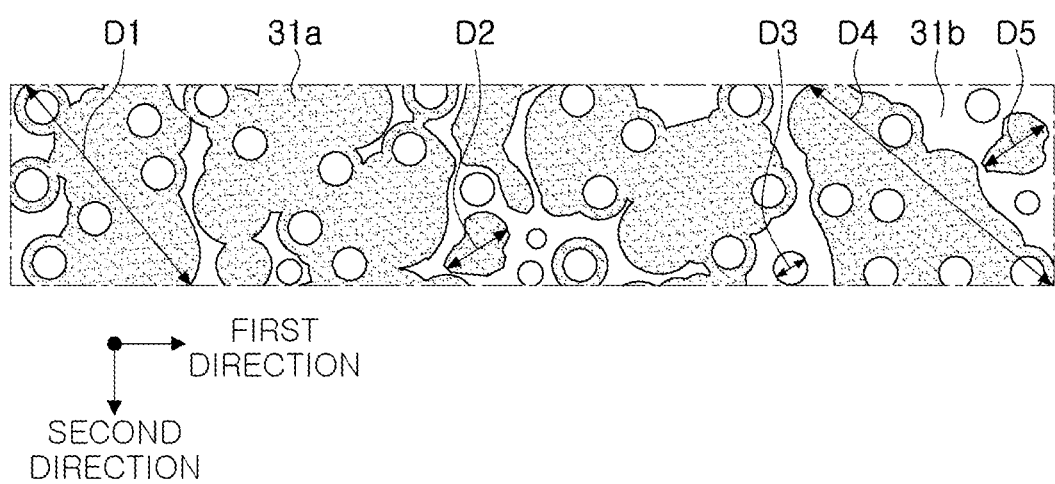
FIG. 8 is a cross-sectional view schematically illustrating a method of measuring a Feret diameter of first conductive particles.

FIG. 8 is a cross-sectional view schematically illustrating a method of measuring a Feret diameter of first conductive particles.

Referring to the drawings, a multilayer electronic component 100 according to an exemplary embodiment in the present disclosure includes a body 110 including a dielectric layer 111 and first and second internal electrodes 121 and 122 alternately disposed with the dielectric layer 111 interposed therebetween and including first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; first and second external electrodes 131 and 132 respectively disposed on the third and fourth surfaces 3 and 4 and connected to the first internal electrode 121; and a third external electrode 133 disposed on the body 110, disposed between the first and second external electrodes 131 and 132 and connected to the second internal electrode 122. The first and second external electrodes 131 and 132 respectively include first electrode layers 131a and 132a connected to the first internal electrode 121 and first conductive resin layers 131b and 132b disposed on the first electrode layers 131a and 132b, the first conductive resin layers 131b and 132b include first conductive particles 31a including at least one of a first metal particle 31a1 and a first intermetallic compound 31a2 and a first resin 31b, and a ratio (N1/N2) of N1 to N2 is 17% or more, in which N1 is the number of particles having a Feret diameter of 14 μm or more, among the first conductive particles 31a1, and N2 is a total number of first conductive particles 31a1.

As described above, when a conductive resin layer having high resistance is applied to protect the multilayer electronic component from stress generated in a mechanical or thermal environment, heat generation of the multilayer electronic component having a 3-terminal type external electrode may occur.

Meanwhile, in the case of the multilayer electronic component 100 according to an exemplary embodiment in the present disclosure, in the first conductive resin layers 131b and 132b included in the first and second external electrodes 131 and 132, when the number of particles having a Feret diameter of 14 μm or more in the first conductive particles 31a is N1 and a total number of first conductive particles 31a is N2, a ratio (N1/N2) of N1 to N2 satisfies 17% or more, so that direct current resistance Rdc of the multilayer electronic component may be reduced, thereby reducing heat generated due to the direct current resistance and providing a multilayer electronic component having excellent reliability.

Hereinafter, each component included in the multilayer electronic component 100 according to an exemplary embodiment in the present disclosure will be described in more detail.

Although a specific shape of the body 110 is not particularly limited, as illustrated, the body 110 may have a hexahedral shape or a shape similar thereto. Due to the shrinkage of ceramic powder particles included in the body 110 or polishing of corners during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first to fourth surfaces 1, 2, 3, and 4 and opposing each other in the third direction.

In the body 110, the dielectric layer 111 and the internal electrodes 121 and 122 may be alternately stacked. The plurality of dielectric layers 111 forming the body 110 are in a sintered state, and adjacent dielectric layers 111 may be integrated so that boundaries therebetween cannot be identified without using a scanning electron microscope (SEM).

The dielectric layer 111 may be formed by preparing a ceramic slurry including ceramic powder, an organic solvent, and a binder, applying and drying the slurry on a carrier film to prepare a ceramic green sheet, and then sintering the ceramic green sheet. The ceramic powder is not particularly limited as long as sufficient capacitance may be obtained, but may include, for example, barium titanate-based (BaTiO$_3$)-based powder.

An average thickness of the dielectric layer 111 is not particularly limited, but may be, for example, 10 μm or less. In addition, the average thickness of the dielectric layer 111 may be arbitrarily set according to desired characteristics or uses. For example, in the case of an electronic component for a high-voltage electric device, the average thickness of the dielectric layer 111 may be less than 2.8 μm, and in the case of small IT electronic components, the average thickness of the dielectric layer 111 may be 0.4 μm or less to achieve miniaturization and high capacitance, but the present disclosure is not limited thereto.

Here, the average thickness of the dielectric layer 111 refers to a size of the dielectric layer 111 disposed between the internal electrodes 121 and 122 in the first direction. The average thickness of the dielectric layer 111 may be measured by scanning cross-sections of the body 110 in the first and second directions with a scanning electron microscope (SEM) at a magnification of 10,000×. More specifically, an average value may be obtained by measuring the thicknesses at a plurality of points of one dielectric layer 111, for example, at 30 points equally spaced in the second direction. The 30 equally spaced points may be designated in a capacitance formation portion Ac to be described later. In addition, if the average value is measured by extending the average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other with the dielectric layer 111 interposed therebetween. The plurality of first internal electrodes 121 and the plurality of second internal electrodes 122 may be electrically separated from each other by the dielectric layer 111 disposed therebetween.

The first internal electrode 121 may be disposed to be connected to the third and fourth surfaces 3 and 4 and to be spaced apart from the fifth and sixth surfaces 5 and 6. In addition, the second internal electrode 122 may be disposed to be spaced apart from the third and fourth surfaces 3 and 4 and connected to the fifth and sixth surfaces 5 and 6.

Referring to FIG. 4, the first internal electrode 121 may include a first opposing portion 121a, a 1-1-th lead portion 121b extending from the first opposing portion toward the third surface 3 and connected to the first external electrode 131, and a 1-2-th lead portion 121c extending from the first opposing portion 121a toward the fourth surface 4 and connected to the second external electrode 132.

Referring to FIG. 5, the second internal electrode 122 may include a second opposing portion 122a and 2-1-th and 2-2-th lead portions 122b and 122c respectively extending from the second opposing portion 122a toward the fifth and sixth surfaces 5 and 6 and connected to the third external electrodes 133-1 and 133-2. However, the present disclosure is not limited thereto, and the second internal electrode 122 may be spaced apart from the fifth and sixth surfaces 5 and 6. For example, the second internal electrode 122 may include a through-electrode passing through the body to be connected to the third external electrode 133 on the first and second surfaces 1 and 2, and the second internal electrode 122 may be connected to the third external electrode 133 through the through-electrode.

The first opposing portion 121a and the second opposing portion 122a may have a flat plate shape perpendicular to the first direction, and the first and second opposing portions 121a and 122a may overlap each other in the first direction with the dielectric layer 111 interposed therebetween to form the capacitance of the multilayer electronic component.

The conductive metal included in the internal electrodes 121 and 122 may be at least one of Ni, Cu, Pd, Ag, Au, Pt, Sn, Ti, and alloys thereof, but the present disclosure is not limited thereto.

The internal electrodes 121 and 122 may be formed by applying a conductive paste for internal electrodes including a conductive metal to a predetermined thickness on a ceramic green sheet and sintering the conductive paste. As a method of printing the conductive paste for internal electrodes, a screen printing method or a gravure printing method may be used, but the present disclosure is not limited thereto.

An average thickness of the internal electrodes 121 and 122 is not particularly limited, but may be, for example, 3 μm or less. In addition, the average thickness of the internal electrodes 121 and 122 may be arbitrarily set according to desired characteristics or uses. For example, in the case of an electronic component for a high-voltage electric device, the average thickness of the internal electrodes 121 and 122 may be less than 1 μm, and in the case of an electronic component for a small IT, the average thickness of the internal electrodes 121 and 122 may be 0.4 μm or less to achieve miniaturization and high capacitance, but the present disclosure is not limited thereto.

The average thickness of the internal electrodes 121 and 122 refers to a size of the internal electrodes 121 and 122 in the first direction. Here, the average thickness of the internal electrodes 121 and 122 may be measured by scanning cross-sections of the body 110 in the first and second directions with a scanning electron microscope (SEM) at a magnification of 10,000×. More specifically, the average value may be obtained by measuring the thickness at a plurality of points of one internal electrode 121 or 122, for example, at 30 points equally spaced in the second direction. The 30 equally spaced points may be designated in the capacitance formation portion Ac to be described later. In addition, if the average value is measured by extending the average value measurement to 10 internal electrodes 121 and 122, the average thickness of the internal electrodes 121 and 122 may be further generalized.

Referring to FIG. 2, the body 110 may include the capacitance formation portion Ac disposed inside the body 110 and forming capacitance by including the first and second internal electrodes 121 and 122 alternately disposed with the dielectric layer 111 interposed therebetween and a first cover portion 112 and a second cover portion 113 respectively disposed on both sides of the capacitance formation portion Ac opposing each other in the first direction. The cover portions 112 and 113 may basically serve to prevent damage to the internal electrodes due to physical or chemical stress. The cover portions 112 and 113 may have the same configuration as the dielectric layer 111 except that they do not include internal electrodes.

A thickness of the cover portions 112 and 113 may not be particularly limited. However, the average thickness of the cover portions 112 and 113 may be 100 μm or less, 30 μm or less, or 20 μm or less in order to reduce a size and increase capacity of the multilayer electronic component. Here, the average thickness of the cover portions 112 and 113 refers to an average thickness of each of the first cover portion 112 and the second cover portion 113.

The average thickness of the cover portions 112 and 113 may refer to an average size of the cover portions 112 and 113 in the first direction, and may be a value obtained by averaging sizes in the first direction measured from 5 points at equal intervals in the cross-sections of the body 110 in the first and second directions.

Referring to FIGS. 1 and 2, the external electrodes may include the first and second external electrodes 131 and 132 respectively disposed on the third and fourth surfaces 3 and 4 of the body 110 and connected to the first internal electrodes 121. The first and second external electrodes may extend on portions of each of the first, second, fifth, and sixth surfaces 1, 2, 5, and 6.

Referring to FIGS. 1 and 3, the external electrode may include the third external electrode 133 disposed on the body 110, disposed between the first and second external electrodes 131 and 132, and connected to the second internal electrode 122. The third external electrode 133 may be disposed on the fifth surface 5 and/or the sixth surface 6, and may extend to a portion of each of the first and second surfaces 1 and 2.

For example, the third external electrode may include a 3-1-th external electrode 133-1 disposed on the fifth surface 5 and a 3-2-th external electrode 133-2 disposed on the sixth surface 6. As illustrated in FIG. 3, the 3-1-th external electrode 133-1 and the 3-2-th external electrode 133-2 may be spaced apart from each other, but the present disclosure is not limited thereto, and the 3-1-th external electrode 133-1 and the 3-2-th external electrode 133-2 may be connected to each other on the first surface 1 and/or the second surface 2 to form one third external electrode.

Referring to FIG. 2, the first and second external electrodes 131 and 132 may include first electrode layers 131a and 132a connected to the first internal electrode 121 and first conductive resin layers 131b and 132b disposed on the first electrode layers 131a and 132a, respectively. In addition, the first and second external electrodes 131 and 132 may include first plating layers 131c and 132c disposed on the first conductive resin layers 131b and 132b and first interfacial layers 131d and 132d disposed between the first electrode layers 131a and 132a and the first conductive resin layers 131b and 132b, respectively.

The first electrode layers 131a and 132b may serve to connect the first internal electrode 121 and the first and second external electrodes 131 and 132.

The first electrode layers 131a and 132a may include a conductive metal and glass, for example, Cu and glass. However, the present disclosure is not limited thereto, and the conductive metal included in the first electrode layers 131a and 132a may be, for example, one or more of Cu, Ni, Pd, Ag, Au, Pt, Sn, Ti, and alloys thereof. The glass included in the first electrode layers 131a and 132a may serve to improve bonding strength between the first and second external electrodes 131 and 132 and the body 110.

The first electrode layers 131*a* and 132*a* may be formed by dipping the third and fourth surfaces 3 and 4 of the body 110 into a conductive paste for external electrodes including conductive metal and glass or by transferring a sheet including a conductive metal and glass and then performing firing.

Hereinafter, the first external electrode 131 will be described in more detail with reference to FIG. 6. However, since the first external electrode 131 and the second external electrode 132 have a symmetrical respect to the second direction, the relationship with description of the first external electrode 131 may also be equally applied to the second external electrode 132.

The first conductive resin layer 131*b* may include first conductive particles 31*a* including at least one of a first metal particle 31*a*1 and a first intermetallic compound 31*a*2 and a first resin 31*b*.

The first resin 31*b* included in the first conductive resin layer 131*b* may basically serve to absorb impact applied to the multilayer electronic component. Accordingly, it is possible to prevent cracks from occurring in the multilayer electronic component by absorbing stress or tensile stress applied during mounting on a board. The first resin 31*b* included in the first conductive resin layer 131*b* is not particularly limited, but may be, for example, a thermosetting resin.

At least some of the plurality of first conductive particles 31*a* may be formed of the first metal particles 31*a*1 or the first intermetallic compound 31*a*2 or may include both the first metal particle 31*a*1 and the first intermetallic compound 31*a*2. The first conductive particle 31*a* including both the first metal particle 31*a*1 and the first intermetallic compound 31*a*2 may exist in a form in which the first intermetallic compound 31*a*2 surrounds the first metal 31*a*1.

The first metal particle 31*a*1 may include, for example, one or more of Ag and Cu, but the present disclosure is not limited thereto. As illustrated in FIG. 6, a shape of the first metal particle 31*a*1 may be a spherical particle, but the present disclosure is not limited thereto, and the first metal particle 31*a*1 may include one or more of a spherical particle or a flake particle.

Here, the spherical particle may include a shape that is not perfectly spherical, and may include a shape in which, for example, a length ratio (major axis/minor axis) between a major axis and a minor axis is 1.45 or less. Flake-shaped particles refer to particles having a flat and elongated shape, and for example, a length ratio (major axis/minor axis) between a major axis and a minor axis may be 1.95 or more, but is not particularly limited. The lengths of the major and minor axes of the spherical particles and the flake-shaped particles may be measured from images obtained by scanning cross-sections of the multilayer electronic component cut in the first and second directions at the center of the multilayer electronic component in the third direction with a scanning electron microscope (SEM).

The first intermetallic compound 31*a*2 may be an intermetallic compound between the first metal particle 31*a*1 and a low melting point metal having a melting point lower than that of the first metal particle 31*a*1. That is, the first intermetallic compound 31*a*2 may be formed as the first metal particle 31*a*1 and the melted low melting point metal react with each other during a drying and curing process of the conductive resin layer 131*b*.

More specifically, the low melting point metal may be a metal having a melting point lower than a curing temperature of the resin 31*b*, and the low melting point metal may have a melting point of 300° C. or less, but the present disclosure is not limited thereto. For example, the low melting point metal may include Sn or a Sn alloy. Accordingly, the first intermetallic compound 31*a*2 may include one or more of $Cu_3Sn$, $Cu_6Sn_5$, and $Ag_3Sn$ formed as the first metal particle 31*a*1 including one or more of Ag and Cu and the low melting point metal including Sn or Sn alloy react with each other.

The first intermetallic compound 31*a*2 may be formed in the form of a network in the first conductive resin layer 131*b*, thereby improving electrical connectivity in the first conductive resin layer 131*b*.

According to an exemplary embodiment in the present disclosure, when the number of particles having a Feret diameter of 14 μm or more, among the first conductive particles 31*a*, is N1 and a total number of first conductive particles 31*a* is N2, the ratio (N1/N2) of N1 to N2 may be greater than or equal to 17%.

Here, the Feret diameter of the first conductive particle 31*a* may refer to a distance from one end edge to the other end edge of the first conductive particle 31*a*, and the Feret diameter may refer to a maximum Feret diameter.

A high ratio (N1/N2) of N1 to N2 means that the ratio of the first conductive particles 31*a* having a Feret diameter of 14 μm or more in the first conductive resin layer 131*b* is high, and a high ratio of the first conductive particles 31*a* having the Feret diameter of 14 μm or more may mean that the connectivity of a network structure inside the first conductive resin layer 131*b* due to the formation of the first intermetallic compound 31*a*2 is excellent.

That is, when the ratio (N1/N2) of N1 to N2 is 17% or more, the electrical connectivity of the network structure inside the first conductive resin layer 131*b* is improved to reduce the DC resistance Rdc of the multilayer electronic component 100, and accordingly, heat generated by resistance may be reduced, thereby improving the reliability of the multilayer electronic component.

In particular, as a multilayer electronic component for a high voltage electric device, when a conductive resin layer having high resistance is applied to improve bending strength of the multilayer electronic component having a 3-terminal type external electrodes, it is particularly important to reduce the amount of heat generated by the multilayer electronic component. Therefore, in the case of having the 3-terminal type external electrodes including the first to third external electrodes 131, 132, and 133, when the ratio (N1/N2) of N1 to N2 satisfies 17% or more, the effect of reducing the amount of generated heat may be more remarkable.

At this time, the N1 value is measured based on the number of first conductive particles 31*a* having the Feret diameter of 14 μm or more in consideration of the diameter of the first conductive particles 31*a* that may contribute to the connectivity of the internal network structure and in consideration of the diameter when each of the first conductive particles 31*a* includes the first intermetallic compound 31*a*2 formed by the reaction of the low melting point metal with at least one or at least two or more first metal particles 31*a*1.

An upper limit of the ratio (N1/N2) of N1 to N2 may not be particularly limited. However, considering the bending strength of the multilayer electronic component, the ratio of N1 to N2 may be 80% or less.

In this case, the Feret diameter of the first conductive particles 31*a* may be measured in the cross-sections of the first conductive resin layer 131*b* in the first and second directions. More specifically, the Feret diameter of the first conductive particles 31*a* may be measured by observing a cross-sectional region of the first conductive resin layer 131*b* by a scanning electron microscope (SEM) at a magnification of 2000 times or more or 5000 times or more, in the cross-sections of the multilayer electronic component 100 cut in the first and second directions at the center of the multilayer electronic component 100 in the third direction.

In addition, in the cross-sectional region of the first conductive resin layer, the Feret diameter of the first conductive particles 31*a* may be measured in a region in which a size in the first direction is 10 μm to 20 μm and a size in the second direction is 10 μm to 35 μm based on the center of the first conductive resin layer in the second direction.

However, the present disclosure is not limited thereto, and for example, the Feret diameter of the first conductive particles 31*a* may be measured in cross-sections of the first conductive resin layer 131*b* in the second and third directions.

In an exemplary embodiment, an average Feret diameter of the first conductive particles 31*a* may be 10 μm or more. When the average Feret diameter of the first conductive particles 31*a* is 10 μm or more, the proportion of the first conductive particles 31*a* that may contribute to the connectivity of the internal network structure is high, so that the effect of reducing the direct current resistance Rdc and reducing the amount of generated heat may be more remarkable.

As described above, the average Feret diameter of the first conductive particles 31*a* may be measured in the cross-sections of the first conductive resin layer 131*b* in the first and second directions. More specifically, the average Feret diameter of the first conductive particles 31*a* may be a value obtained by observing a cross-sectional region of the first conductive resin layer 131*b* in cross-sections cut in the first and second directions at the center of the multilayer electronic component 100 in the third direction with a scanning electron microscope (SEM) at a magnification of 1000 times or more or 2000 times or more and then averaging maximum Feret diameters of the plurality of first conductive particles 31*a* observed in the cross-sectional region.

The average thickness of the first conductive resin layer 131*b* may not be particularly limited. However, the average thickness of the first conductive resin layer 131*b* measured on the third surface may be 30 μm or less. When the average thickness of the first conductive resin layer 131*b* measured on the third surface is 30 μm or less, resistance due to the first conductive resin layer 131*b* may be reduced and the ratio of the Feret diameter of the first conductive particles 31*a* to the thickness of the first conductive resin layer 131*b* may increase, so that the electrical connectivity of the first conductive resin layer 131*b* may be more effectively improved.

For example, the first conductive resin layer 131*b* may be formed by applying a conductive resin composition including metal powder, low melting point metal powder, and a thermosetting resin on the first electrode layer 131*a* and performing curing heat treatment. The metal powder may be, for example, one or more of Ag powder, Cu powder, and Ag-coated Cu powder, and the thermosetting resin may be, for example, a bisphenol A resin, a glycol epoxy resin, a novolak epoxy resin, or a resin having a small molecular weight and being liquid at room temperature, among derivatives thereof. The low melting point metal powder may include one or more of Sn or Sn alloy powder, for example, Sn, $Sn_{96.5}Ag_{3.0}Cu_{0.5}$, $Sn_{42}Bi_{58}$ and $Sn_{72}Bi_{28}$.

In an exemplary embodiment, the first interfacial layer 131*d* may include a second intermetallic compound 131*d*1. The second intermetallic compound 131*d*1 may be an intermetallic compound between the metal of the first electrode layer 131*a* and the low melting point metal. That is, the second intermetallic compound 131*d*1 may be formed by a mutual reaction between the metal of the first electrode layer 131*a* and the melted low melting point metal during a drying and curing process of the conductive resin layer 131*b*. For example, when the low melting point metal includes Sn or a Sn alloy, the second intermetallic compound 131*d*1 may include $Cu_3Sn$.

The first interfacial layer 131*d* prevents a lifting defect between the first electrode layer 131*a* and the first conductive resin layer 131*b* from occurring, thereby improving adhesion between the first electrode layer 131*a* and the first conductive resin layer 131*b*.

The first interfacial layer 131*d* may further include a glass 131*d*2 in contact with the first electrode layer 131*a*. When the second intermetallic compound 131*d*1 is formed by a mutual reaction between the metal of the first electrode layer 131*a* and the low melting point metal including Sn or an Sn alloy, glass exposed to the surface of the first electrode layer, among glass included in the first electrode layer 131*a*, may remain without reacting, and the remaining glass 131*d*2 may form the first interfacial layer 131*d* together with the second intermetallic compound 131*d*1.

The first interfacial layer 131*d* may be continuously disposed on the first electrode layer or discontinuously disposed on the first electrode layer.

In an exemplary embodiment, at least some of the first conductive particles 31*a* may connect the first interfacial layer 131*d* and the first plating layer 131*c*. This may improve the electrical connectivity between the first interfacial layer 131*d* and the first plating layer 131*c* and prevent the occurrence of lifting in the interface between the first conductive resin layer 131*b* and the first interfacial layer 131*d* and in the interface between the first conductive resin layer 131*b* and the first plating layer 131*c*.

The first plating layer 131*c* may improve mounting characteristics. The type of the first plating layer 131*c* is not particularly limited, and may be a plating layer including nickel (Ni), tin (Sn), palladium (Pd), and/or alloys thereof, and may be formed of a plurality of layers. For example, the first plating layer 131*c* may include a 1-1-th plating layer 131*c*1 and a 1-2-th plating layer 131*c*2 sequentially stacked on the first conductive resin layer, and for example, the 1-1-th plating layer 131*c*1 may include Ni and the 1-2-th plating layer 131*c*2 may include Sn, but the present disclosure is not limited thereto.

Hereinafter, the third external electrode 133 will be described in more detail with reference to FIG. 7. However, since the third external electrode 133 may have a structure similar to that of the first external electrode 131, the description of the first external electrode 131 that does not contradict the description to be described later may be equally applied to the third external electrode 133.

FIG. 7 is an enlarged view of region K2 of the 3-1-th external electrode 133-1. However, although the 3-1-th external electrode 133-1 and the 3-2-th external electrode 133-2 are spaced apart from each other, the 3-1-th external electrode 133-1 and the 3-2-th external electrode 133-2 are symmetrical to each other in the third direction, and therefore, the description of the 3-1-th external electrode 133-1 may be equally applied to the 3-2-th external electrode 133-2.

Referring to FIG. 7, the third external electrode 133 may include a third electrode layer 133*a* connected to the second internal electrode 122, a third conductive resin layer 133*b* disposed on the third electrode layer, and a third plating layer 133c disposed on the third conductive resin layer 133b.

The third electrode layer 133a may include a conductive metal and glass, for example, Cu and glass, but the present disclosure is not limited thereto.

The third plating layer 133c may include a 3-1-th plating layer 133c1 and a 3-2-th plating layer 133c2 sequentially stacked on the third conductive resin layer 133b, and the 3-1-th plating layer 133c1 may include Ni and the 3-2-th plating layer 133c2 may include Sn, but the present disclosure is not limited thereto.

The third conductive resin layer 133b may include a third conductive particle 33a including at least one of a third metal particle 33a1 and a third intermetallic compound 33a2 and a third resin 33b.

The third resin 33b may be, for example, a thermosetting resin, and may include the same resin as the first resin 31b, but the present disclosure is not limited thereto, and the third resin 33b may include a resin different from the first resin 31b.

The third metal particle 33a1 may include, for example, one or more of Ag and Cu, and may include the same metal as the first metal particle 31a1 or a metal different from each other.

The third intermetallic compound 33a2 may be an intermetallic compound between the third metal particle 33a1 and a low melting point metal having a melting point lower than that of the third metal particle 33a1. That is, the third intermetallic compound 33a2 may be formed by a mutual reaction between the third metal particle 33a1 and the melted low melting point metal during a drying and curing process of the third conductive resin layer 133b.

For example, the low melting point metal may include Sn or a Sn alloy, and thus, the third intermetallic compound 33a2 may include one or more of $Cu_3Sn$, $Cu_6Sn_5$, and $Ag_3Sn$, and the third intermetallic compound 33a2 may include the same intermetallic compound as the first intermetallic compound 31a2 or may include different intermetallic compounds.

As illustrated in FIG. 7, the third intermetallic compound 33a2 may be formed in a network form within the third conductive resin layer 133b, thereby improving electrical connectivity within the third conductive resin layer 133b.

In an exemplary embodiment, when the number of particles having a Feret diameter of 14 μm or more, among the third conductive particles 33a, is N1' and a total number of third conductive particles 33a is N2', the ratio (N1'/N2') of N1' to N2' may be 17% or more.

Here, the Feret diameter of the third conductive particle 33a may refer to a distance from one end edge to the other end edge of the third conductive particle 33a, like the Feret diameter of the first conductive particle 31a described above. The Feret diameter may refer to a maximum Feret diameter.

A high ratio (N1'/N2') of N1' to N2' means that the ratio of the third conductive particles 33a having a Feret diameter of 14 μm or more in the third conductive resin layer 133b is high, and a high ratio of the third conductive particles 33a having the Feret diameter of 14 μm or more may mean that the connectivity of a network structure inside the third conductive resin layer 133b due to the formation of the third intermetallic compound 33a2 is excellent.

When the ratio (N1'/N2') of N1' to N2' is 17% or more, the electrical connectivity of the internal network structure of the third conductive resin layer 133b may be improved to reduce the DC resistance Rdc of the multilayer electronic component, and accordingly, the reliability of the multilayer electronic component may be improved by reducing heat generated by the resistance.

Meanwhile, in the multilayer electronic component 100 according to an exemplary embodiment in the present disclosure, when both the ratio (N1/N2) of N1 to N2 and the ratio (N1'/N2') of N1' to N2' satisfy 17% or more, the reliability improvement effect of the present disclosure may be more remarkable.

In this case, the Feret diameter of the third conductive particles 33a may be measured in the cross-sections of the third conductive resin layer 133b in the first and third directions. More specifically, the Feret diameter of the first conductive particles 31a may be measured by observing a cross-sectional region of the third conductive resin layer 133b by a scanning electron microscope (SEM) at a magnification of 1000 times or more or 2000 times or more, in the cross-sections of the multilayer electronic component 100 cut in the first and third directions at the center of the multilayer electronic component 100 in the second direction.

In an exemplary embodiment, the average Feret diameter of the third conductive particles 33a may be 10 μm or more. When the average Feret diameter of the third conductive particles 33a is 10 μm or more, the ratio of the third conductive particles 33a that may contribute to the connectivity of the internal network structure is high, so that the effect of reducing the direct current resistance Rdc and reducing the amount of generated heat may be more remarkable.

As described above, the average Feret diameter of the third conductive particles 33a may be obtained by measuring the cross-sections of the third conductive resin layer 133b in the first and third directions. More specifically, the average Feret diameter of the third conductive particles 33a may be a value obtained by observing a cross-sectional region of the third conductive resin layer 133b in cross-sections cut in the first and third directions at the center of the multilayer electronic component 100 in the second direction with a scanning electron microscope (SEM) at a magnification of 1000 times or more or 2000 times or more and then averaging maximum Feret diameters of the plurality of third conductive particles 33a observed in the cross-sectional region.

In an exemplary embodiment, the third external electrode 133 may include a third interfacial layer 133d disposed between the third electrode layer 133a and the third conductive resin layer 133b and including a fourth intermetallic compound 133d1. In addition, the third interfacial layer 133d may further include a glass 133d2 in contact with the third electrode layer 133a.

The fourth intermetallic compound 133d1 of the third interfacial layer 133d may be an intermetallic compound between the metal of the third electrode layer 133a and the low melting point metal. For example, when the low melting point metal includes Sn or a Sn alloy, the fourth intermetallic compound 133d1 may include $Cu_3Sn$. The fourth intermetallic compound 133d1 may include the same intermetallic compound as the second intermetallic compound 131d1 or may include intermetallic compounds different from each other.

The third interfacial layer 133d prevents a lifting defect between the third electrode layer 133a and the third conductive resin layer 133b from occurring, thereby improving adhesion between the third electrode layer 133a and the third conductive resin layer 133b.

Experimental Example

First, after preparing a body including a dielectric layer and internal electrodes, the third and fourth surfaces of the body were dipped in a conductive paste including conductive material and glass, and then sintered to prepare a first electrode layer. Thereafter, a conductive resin composition including metal powder, low melting point metal powder, and thermosetting resin was applied to the body on which the first electrode layer was formed, and was subjected to curing heat treatment to prepare a first conductive resin layer, and a Ni plating layer and an Sn plating layer were sequentially formed on the first conductive resin layer to form first and second external electrodes.

In the same manner, a third electrode layer, a third conductive resin layer, a Ni plating layer, and a Sn plating layer were sequentially formed on the fifth and sixth surfaces of the body to form a third external electrode to prepare a sample chip.

Thereafter, in cross-sections cut in the first and second directions at the center of the sample chip in the third direction, a cross-sectional region of the first conductive resin layer (size in the first direction: 10 μm to 20 μm, size in the second direction: 10 μm to 35 μm) was scanned with a scanning electron microscope (SEM) under the conditions that acceleration voltage was 10 kV, working distance (WD) was 8 to 12 mm, and analysis magnification was 2000 times to obtain an image of the first conductive resin layer.

Thereafter, the obtained image was processed with the ImageJ program to process a region in which the first conductive particles were formed in black and white, and then a maximum Feret diameter of the first conductive particles was measured through the ImageJ program. At this time, as illustrated in FIG. 8, the Feret diameter of the first conductive particle was measured as a maximum distance (D1, D2, D3, D4, D5, . . . ) from one end edge to the other end edge of the first conductive particle 31*a*.

Meanwhile, the first conductive particles extending over the periphery of the cross-sectional area of the first conductive resin layer had a Feret diameter twice the measured Feret diameter, and a measured value of 0.5 μm or less was excluded to remove noise. In addition, after measuring the ratio (N1/N2) of the number of first conductive particles having a Feret diameter of 14 μm or more to a total number of first conductive particles for a total of 20 samples for each test number, the average value was calculated as listed in Table 1 below.

DC resistance Rdc was measured by bringing a contact tip of a tweezers probe of an LCR meter into contact with each of the first and second external electrodes of the sample chip. After measuring the DC resistance for a total of 20 samples for each test number, average values were calculated as listed in Table 1 below.

TABLE 1

| Test number | N1/N2 | DC resistance (mΩ) |
| --- | --- | --- |
| 1 | 1.51 | 52.648 |
| 2 | 2.04 | 58.362 |
| 3 | 11.13 | 52.012 |
| 4 | 13.06 | 45.126 |
| 5 | 15.00 | 46.084 |
| 6 | 18.25 | 23.653 |
| 7 | 19.75 | 26.995 |
| 8 | 22.70 | 29.346 |
| 9 | 26.25 | 21.866 |

Referring to Table 1, it can be seen that test numbers 1 to 5 have N1/N2 less than 17% and DC resistance of 40 mΩ or more. Meanwhile, it can be seen that the DC resistance decreases sharply from test number 6. That is, it can be seen that, in Test Nos. 6 to 9, N1/N2 was 17% or more, and electrical connectivity was improved to reduce the DC resistance of the sample chip, thereby lowering the amount of generated heat.

As one of the various effects of the present disclosure, it is possible to prevent a lifting defect from occurring due to outgassing occurring in a conductive resin layer.

As one of the various effects of the present disclosure, the electrical connectivity of the conductive resin layer is improved.

As one of the various effects of the present disclosure, a multilayer electronic component having low DC resistance and reducing the amount of generated heat may be provided.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
first and second external electrodes respectively disposed on the third and fourth surfaces and connected to the first internal electrode; and
a third external electrode disposed on the body, disposed between the first and second external electrodes and connected to the second internal electrode,
wherein one of the first and second external electrodes includes a first electrode layer connected to the first internal electrode and a first conductive resin layer disposed on the first electrode layer,
the first conductive resin layer includes first conductive particles including at least one of a first metal particle and a first intermetallic compound and a first resin, and
a ratio (N1/N2) of N1 to N2 is 17% or more, in which N1 is the number of particles having a Feret diameter of 14 μm or more, among the first conductive particles, and N2 is a total number of first conductive particles.

2. The multilayer electronic component of claim 1, wherein the Feret diameter of the first conductive particle is measured in a cross-section of the first conductive resin layer in the first and second direction.

3. The multilayer electronic component of claim 2, wherein, in the cross-section of the first conductive resin layer in the first and second directions, the Feret diameter of the first conductive particle is measured in a region in which a size in the first direction is 10 μm to 20 μm and a size in the second direction is 10 μm to 35 μm based on a center of the first conductive resin layer in the second direction.

4. The multilayer electronic component of claim 1, wherein an average Feret diameter of the first conductive particles is 10 μm or more.

5. The multilayer electronic component of claim 1, wherein the third external electrode includes a 3-1-th external electrode disposed on the fifth surface and a 3-2-th external electrode disposed on the sixth surface.

6. The multilayer electronic component of claim 1, wherein
the third external electrode includes a third electrode layer connected to the second internal electrode and a third conductive resin layer disposed on the third electrode layer,
the third conductive resin layer includes third conductive particles including at least one of third metal particles and a third intermetallic compound and a third resin, and
a ratio (N1'/N2') of N1' to N2' is greater than or equal to 17%, in which N1' is the number of particles having a Feret diameter of 14 μm or more, among the third conductive particles, and N2' is a total number of third conductive particles.

7. The multilayer electronic component of claim 6, wherein the Feret diameter of the third conductive particle is measured in a cross-section of the third conductive resin layer in the first and third directions.

8. The multilayer electronic component of claim 1, wherein the first intermetallic compound is an intermetallic compound between the first metal particle and a low melting point metal having a melting point lower than that of the first metal particle.

9. The multilayer electronic component of claim 8, wherein the first metal particle includes at least one of Ag and Cu, the low melting point metal includes Sn or an Sn alloy, and the first intermetallic compound includes one or more of $Cu_3Sn$, $Cu_6Sn_5$, and $Ag_3Sn$.

10. The multilayer electronic component of claim 1, wherein the one of the first and second external electrodes includes a first interfacial layer including a second intermetallic compound and disposed between the first electrode layer and the first conductive resin layer.

11. The multilayer electronic component of claim 10, wherein the second intermetallic compound includes $Cu_3Sn$.

12. The multilayer electronic component of claim 10, wherein the first interfacial layer further includes glass in contact with the first electrode layer.

13. The multilayer electronic component of claim 10, wherein the one of the first and second external electrodes includes a first plating layer disposed on the first conductive resin layer, and at least some of the first conductive particles connect the first interfacial layer and the first plating layer.

14. The multilayer electronic component of claim 1, wherein an average thickness of the first conductive resin layer measured on the third surface is 30 μm or less.

15. The multilayer electronic component of claim 1, wherein the first electrode layer includes Cu and glass.

16. A multilayer electronic component comprising:
a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
first and second external electrodes respectively disposed on the third and fourth surfaces and connected to the first internal electrode; and
a third external electrode disposed on the body, disposed between the first and second external electrodes and connected to the second internal electrode,
wherein the third external electrode includes a third electrode layer connected to the second internal electrode and a third conductive resin layer disposed on the third electrode layer,
the third conductive resin layer includes third conductive particles including at least one of third metal particles and a third intermetallic compound and a third resin, and
a ratio (N1'/N2') of N1' to N2' is greater than or equal to 17%, in which N1' is the number of particles having a Feret diameter of 14 μm or more, among the third conductive particles, and N2' is a total number of third conductive particles.

17. The multilayer electronic component of claim 16, wherein the third external electrode includes a 3-1-th external electrode disposed on the fifth surface and a 3-2-th external electrode disposed on the sixth surface.

18. The multilayer electronic component of claim 16, wherein the Feret diameter of the third conductive particle is measured in a cross-section of the third conductive resin layer in the first and third directions.

19. The multilayer electronic component of claim 16, wherein the third intermetallic compound is an intermetallic compound between the third metal particle and a low melting point metal having a melting point lower than that of the third metal particle.

20. The multilayer electronic component of claim 16, wherein the third external electrode includes a third interfacial layer including a fourth intermetallic compound and disposed between the third electrode layer and the third conductive resin layer and glass in contact with the third electrode layer.

* * * * *